United States Patent
Senese et al.

(10) Patent No.: US 9,071,964 B2
(45) Date of Patent: Jun. 30, 2015

(54) METHOD AND APPARATUS FOR AUTHENTICATING A DIGITAL CERTIFICATE STATUS AND AUTHORIZATION CREDENTIALS

(75) Inventors: Thomas J. Senese, Schaumburg, IL (US); Chris A. Kruegel, Plainfield, IL (US); Timothy G. Woodward, Tempe, AZ (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 460 days.

(21) Appl. No.: 13/234,640

(22) Filed: Sep. 16, 2011

(65) Prior Publication Data
US 2013/0072155 A1   Mar. 21, 2013

(51) Int. Cl.
*H04M 1/66* (2006.01)
*H04L 29/06* (2006.01)
*H04K 1/00* (2006.01)
*H04W 12/06* (2009.01)

(52) U.S. Cl.
CPC ........... *H04W 12/06* (2013.01); *H04L 63/0823* (2013.01)

(58) Field of Classification Search
CPC ...................... H04W 12/06; H04L 63/0823
USPC .......... 455/410–411, 463, 518–521; 370/349, 370/389, 392, 471, 474; 379/142.05; 713/160, 168, 170, 176; 380/44–47, 380/247–250, 270–273, 277–286; 726/3–5, 726/16–21, 27–30
See application file for complete search history.

(56) References Cited

U.S. PATENT DOCUMENTS

| | | | |
|---|---|---|---|
| 5,809,148 A * | 9/1998 | Doberstein et al. | 713/161 |
| 7,797,411 B1 * | 9/2010 | Guruswamy et al. | 709/223 |
| 2003/0056012 A1 * | 3/2003 | Modeste et al. | 709/249 |
| 2003/0126464 A1 * | 7/2003 | McDaniel et al. | 713/201 |
| 2007/0206535 A1 * | 9/2007 | Sood et al. | 370/331 |
| 2008/0083013 A1 * | 4/2008 | Soliman et al. | 726/1 |
| 2008/0162929 A1 * | 7/2008 | Ishikawa et al. | 713/160 |
| 2009/0164774 A1 * | 6/2009 | Sherkin | 713/155 |
| 2010/0042824 A1 * | 2/2010 | Lee et al. | 713/2 |
| 2010/0049986 A1 * | 2/2010 | Watanabe et al. | 713/181 |
| 2011/0004840 A1 * | 1/2011 | Feinberg et al. | 715/772 |

OTHER PUBLICATIONS

TIA 102.AACE Standard; Project 25; Digital Land Mobile Radio Link Layer Authentication; Apr. 2011; 50 Pages.
TIA 102.BAAA-A Standard; Project 25; FDMA—Common Air Interface; New Technology Radio Technical Standards; Sep. 17, 2003; Section 6; pp. 21-31.

* cited by examiner

*Primary Examiner* — Michael Mapa
(74) *Attorney, Agent, or Firm* — Daniel R. Bestor

(57) ABSTRACT

A radio is authenticated at the site and unique authentication information for the radio is stored at the site. A subsequent non-authentication message from the radio is received at the site and authentication information in the non-authentication message is identified. The unique authentication information stored at the site is compared with authentication information identified in the non-authentication message. If there is a match, the non-authentication message is authenticated with an authentication code included in the non-authentication message, wherein a predefined portion of the authentication code is obtained from at least one of a header portion or a data portion of the non-authentication message. Upon successfully completing authentication, the site repeats the non-authentication message towards destination radios indicated in non-authentication message.

11 Claims, 4 Drawing Sheets

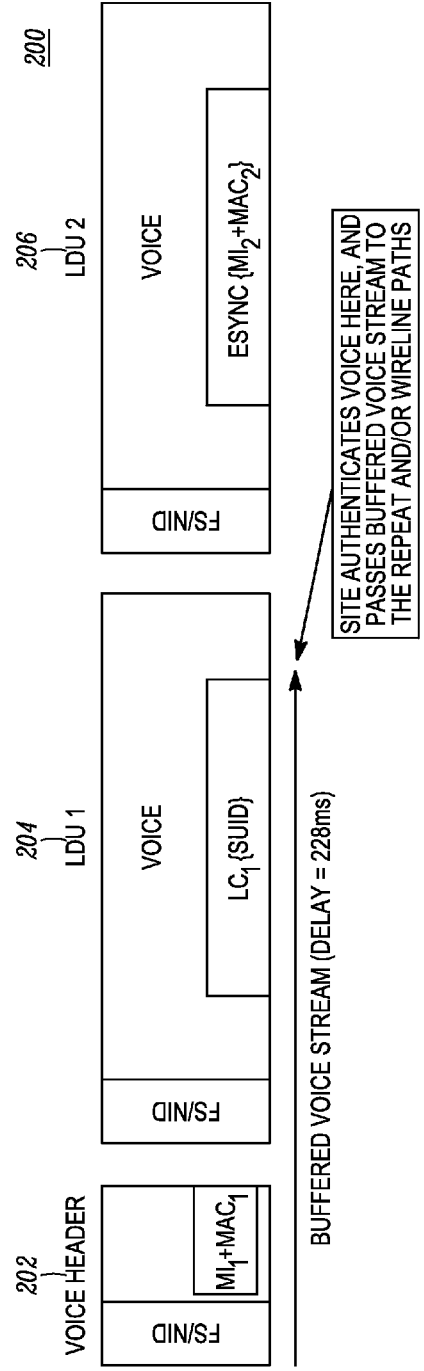
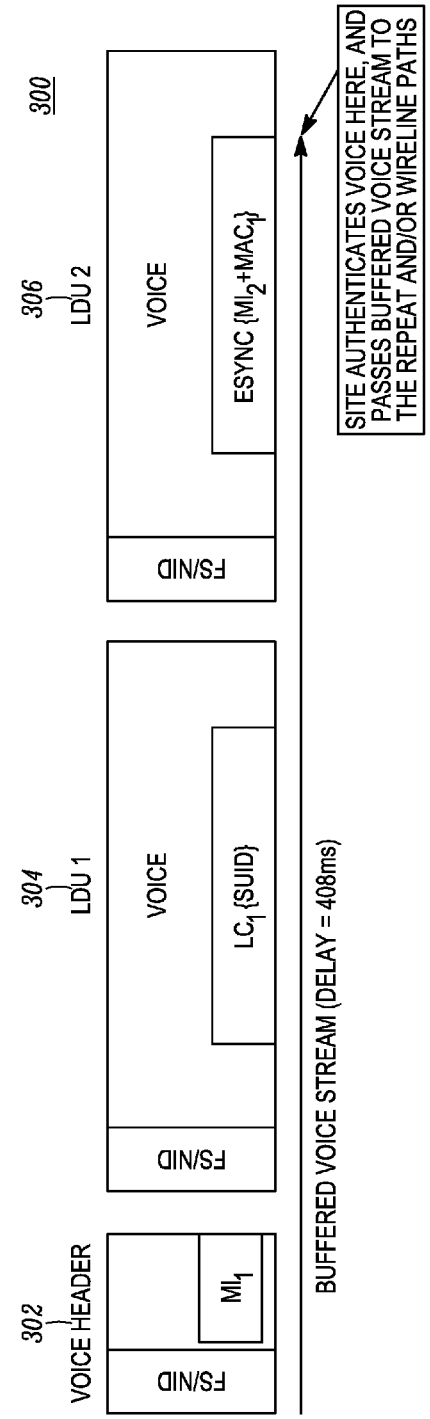
FIG. 2
FIG. 3

METHOD AND APPARATUS FOR AUTHENTICATING A DIGITAL CERTIFICATE STATUS AND AUTHORIZATION CREDENTIALS

FIELD OF THE DISCLOSURE

The present disclosure relates generally to radio authentication, and more particularly, to a method and apparatus for authenticating the source of each message transmitted in a conventional radio frequency site.

BACKGROUND

Institutional organizations, such as public safety organizations, typically use specialized voice communication systems to facilitate group discussions. Voice communication systems are typically embodied as narrowband radio systems which support low-bit-rate digital transmission of voice streams. An example of such a voice communication system is a Project 25-compatible voice communication system which includes wireless and wired voice communication devices. The voice communication devices may be, for example, portable narrowband two-way radios, mobile radios, dispatch consoles, or other similar voice communication entities which communicate with one another via wired and/or wireless networks. For simplicity sake, the mobile voice communication devices are referred to as radios.

Radios in a voice communication system may operate in conventional mode or in trunked mode. In the conventional mode, there is no method of authenticating voice, data and control messages sent from a radio. Thus, there is no protection against cloning, spoofing, replay and traffic analysis.

In the trunked mode, each radio registers with a control entity, for example a base station or a repeater, and uses a symmetric secret key authentication method. In this method, one secret key is shared between the control entity and the radio. When the radio registers with a site (a system with one or more channels), a fixed network equipment (FNE) such as a router or a cell tower sends an authentication challenge to the radio. The radio cryptographically authenticates itself and responds with a derived cipher key (DCK). If the FNE accepts the response from the radio, the FNE may return a common cipher key (CCK) that is encrypted with the DCK. Thereafter, all communication between the radio and the control entity may be encrypted with the CCK.

However, if the successfully authenticated radio is later lost or stolen, in a system with a mix of trunked and conventional sites, an attacker, on a conventional site, could reuse the radio identifier, obtained from a trunked site, to impersonate the authenticated radio. For example, if a radio associated with a high ranking officer such as a police chief is lost after authentication, an attacker could reuse the radio identifier associated with the authenticated radio on another radio. When this occurs, messages sent from the other radio will appear to others in the system as though it originated from the authenticated radio.

Accordingly, a method and apparatus are needed to authenticate radios operating in conventional and trunked modes and to authenticate messages transmitted in both modes.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a block diagram of a voice packet sent from a radio in accordance with some embodiments.

FIG. 3 is another block diagram of a voice packet sent from a radio in accordance with some embodiments.

Figure 1:
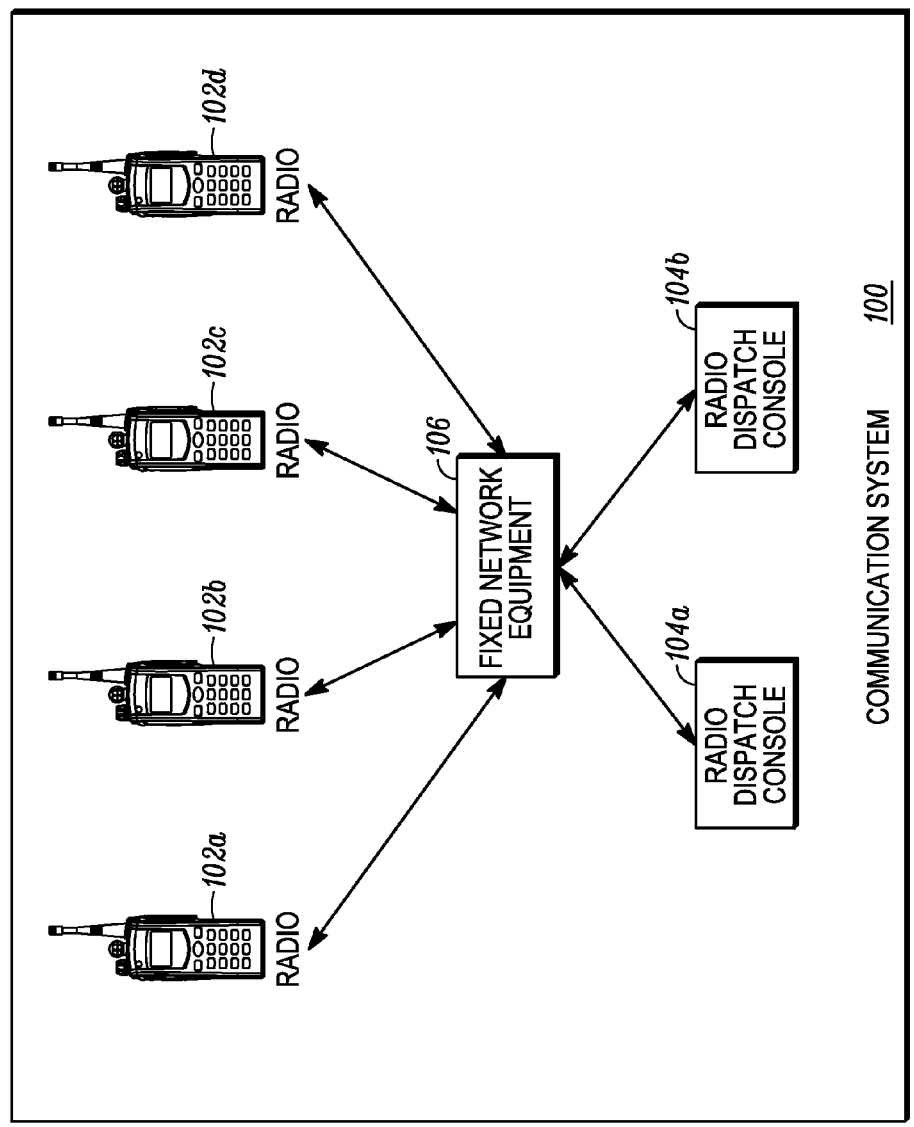
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for authenticating a message stream in a site. A radio is authenticated at the site and unique authentication information for the radio is stored at the site. A subsequent non-authentication message from the radio is received at the site and authentication information in the non-authentication message is identified. The unique authentication information stored at the site is compared with authentication information identified in the non-authentication message. If there is a match, the non-authentication message is authenticated with an authentication code included in the non-authentication message, wherein a predefined portion of the authentication code is obtained from at least one of a header portion or a data portion of the non-authentication message. Upon successfully completing authentication, the site repeats the non-authentication message towards destination radios indicated in non-authentication message.

FIG. 1 is a block diagram of a communication system in accordance with some embodiments. Communication system 100 may include portable/mobile communication devices 102 and fixed communication devices 104. Portable/mobile communication devices 102 may be radios, for example, portable two-way radios, mobile radios, or other similar portable or mobile voice communication devices. Portable/mobile communication devices 102 are referred to as radios in this discussion. Fixed communication devices 104 may be consoles, for example, radio dispatch consoles. Radios 102 are used to facilitate voice communications between operating users and are configured to encrypt and decrypt voice streams. Each radio 102 may transmit voice streams directly to other radio or through fixed network equipment (FNE) 106 such as a router or a cell tower. Radios 102 may operate in accordance with any standard or digital voice communication protocol that provides for encryption, including, but not limited to, Project 25 (P25), Terrestrial Trunk Radio (TETRA), Digital Mobile Radio (DMR), and other Land Mobile Radio (LMR) radio network technologies. It should be apparent to one skilled in the art that other components of voice communications system 100 are not shown for the sake of simplicity.

When a radio, for example radio 102a, initially requests access to a conventional radio frequency (RF) site with one or more channels, an authentication handshake occurs. The cryptographic steps in the authentication handshake are based off a shared master key (K) for the radio. In particular, the radio sends an authentication request to FNE 106, for example an RF access point, a cell tower or a router, in the RF site. The conventional RF site (also simple referred to as the "site") responds with an authentication demand with a challenge. The radio responds cryptographically to the demand and derives a cipher key (DCK) from an authentication session key. If the site accepts the radio response and the handshake is successful, the site recognizes the radio identifier and DCK as authentic. The DCK is thus unique to the radio identifier.

When the radio is successfully authenticated, the site updates an authorization table that stores the radio/source ID (SUID), the DCK, and a current message number. In an embodiment, the message number initializes to one every time a new DCK is derived. At the conclusion of the authentication handshake, the site may send a common cipher key (CCK), encrypted with the DCK, to the radio. According to an embodiment, after authenticating the radio, the site will only accept an air frame if a decoded SUID in the air frame appears in the authorization table. The decoded SUID belongs to a radio sending the air frame and the authenticity of SUID is validated using the DCK stored in the authorization table. If the SUID of the received air frame is validated, the site is configured to repeat the signal and also to pass the signal down a wire-line.

FIG. 2 is a block diagram of a voice packet sent from a radio in accordance with some embodiments. Voice packet 200 includes a voice header 202 and a first pair of logical data units (LDU)—LDU1 204 and LDU2 206. Each of the LDUs includes voice information that is to be repeated by the site. As shown in FIG. 2, voice header 202 does not include a source ID. Instead, voice header 202 includes a Frame Sync Net ID (FSNID) field which specifies the type of air frame and a field with a message indicator (MI) and a message authentication code (MAC). The MI is used to compute the MAC and is used also for voice encryption. The MI is also used to describe a subsequent pair of LDUs (i.e. the next LDU1 and LDU2) in the voice packet. In addition to the DCK, all inbound messaging (voice, data and control messages) between the radio and the site is authenticated with the MAC, which is a function of the DCK.

Because voice header 202 does not include the source ID for the radio sending the voice packet, the site cannot cryptographically authenticate the voice header using the DCK. Hence, in an embodiment, the site may hold on to the voice header 202 until it validates the DCK. The site may validate the DCK by decoding an embedded link control (LC) value in LDU1 204. After validating the DCK, the site sends voice header 202, followed by LDU1 204, on the repeat path and on the wire-line path.

In order to validate the DCK and therefore the authenticity of the voice stream, the site must be able to identify the MI, SUID and MAC. The MI and MAC are found in voice header 202 and LDU2 206. The SUID is found in the LC block in LDU1 204. In one embodiment, the MAC that is calculated for the LC block in the very first LDU1 is encoded in voice header 202. In general, the MAC will always be calculated for the LC block that appears in the following LDU. To identify the MI, SUID and MAC, the site buffers voice header 202 and part of LDU1 204 until it can complete the authentication.

Once LDU1 204 is received, the contents of the LC embedded in LDU1 204 are used as the message digest for the MAC calculation. The MAC value for the subsequent pair of LDUs is placed in LDU2 206. The site may not pass/repeat LDU1 204 or LDU2 206 until the MAC of the LC (from LDU 1) is properly validated using the correct DCK. If the MAC validation based on the DCK fails, the site will block and discard the voice stream. The MI used to compute the MAC is the same as used for voice encryption. However, the MAC uses a different keystream, because a different key (DCK) is used. The MI may be enabled for clear end-to-end voice, because each DCK/MAC computation relies on a unique MI value. In an embodiment, a non-zero MI value may be used for clear voice.

For voice operation, the radio reuses the same MI that it uses for encrypted voice. This MI is selected from a Linear Feedback Shift Register (LFSR). When the voice is not encrypted, the radio may select a random value for the MI. In this case, the MI will only be used for message authentication. An MI of all zeroes indicates that the radio is not computing a MAC through DCK. It is not necessary for the site to use an LFSR. The site simply reads the MI value in the voice stream, and validates the reported MAC based off of that MI.

Either a cipher MAC (C-MAC) or hashed MAC (H-MAC) can be used. For C-MAC, the last 16 bits of the cipher stream will be used as the MAC value. For H-MAC, a 16-bit hash of the message digest will be encrypted. In both cases, the message digest is the concatenation of the LC block with the current MI.

When a 16-bit MAC is used, eight bits of the 16-bit MAC are placed in the least significant 8 bits of the MI. In, for example the P25 protocol, the MI field contains 72 bits. However, only 64 of those bits are used for encryption (AES and DES). The remaining 8 bits are reserved. The other eight bits of the 16-bit MAC are placed in the LC block, using an implied manufacture ID (MFID) format. The implied MFID format defines a new LC and provides an extra byte in the link control word. This segment of the MAC occupies the 8 bits that are otherwise used for the MFID in the Explicit MFID format for Link Control.

In an alternate embodiment, an 8-bit MAC may be used. The use of an 8-bit MAC may be simpler, though less secure. If an 8-bit MAC is used, the value can either be encoded within the MI field or within the LC block.

As noted above, the site must be able to identify the MI, SUID and MAC before it can validate the authenticity of the voice stream. There is therefore a delay associated with buffering voice header 202 and part of LDU1 204 until authentication is completed. As is known in the art, there is no audio in the voice header 202. However, voice header 202 must be transmitted to the receiver before LDU1 204, and contributes 82.5 ms of serialization delay. Up to 145.5 ms of audio delay occurs from buffering a portion of LDU1 204 until the LC is decoded. At that point, the LC can be authenticated. Therefore, the total additive audio delay for normal entry is 82.5+145.5=228 ms.

FIG. 3 is another block diagram of a voice packet sent from a radio in accordance with some embodiments. As shown in FIG. 3, the MAC is always calculated for the LC block that appears in the preceding LDU1 i.e., LDU1 304. This implies that there is no MAC value that is encoded in voice header 302. The site buffers voice header 302, LDU1 304, and part of LDU2 306 until it can complete the authentication. Similar to the voice packet of FIG. 2, there is no audio in voice header 302. However, voice header 302 must be transmitted to the receiver before LDU 1, and contributes 82.5 ms of serialization delay. The buffering of the entire LDU 1 results in 180 ms of audio delay. Up to 145.5 ms of audio delay occurs from buffering a portion of LDU 2 until the MAC is decoded. Therefore, the total additive audio delay for this embodiment is 82.5+180+145.5=408 ms.

Figure 4:
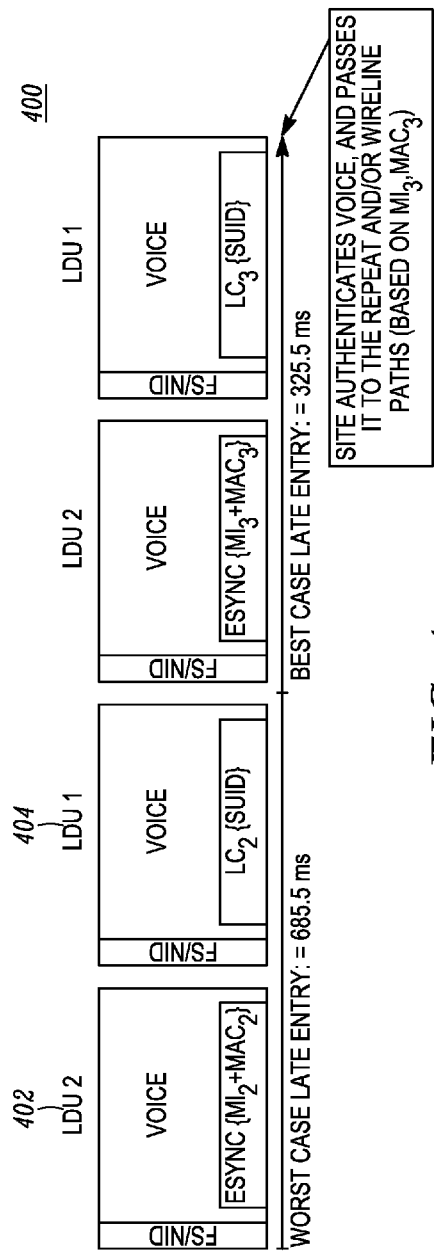
FIG. 4 is a block diagram of a voice packet sent from a radio with a late entry delay in accordance with some embodiments.

FIG. 4 is a block diagram of a voice packet sent from a radio with a late entry delay in accordance with some embodiments. The best-case late entry is 325.5 ms. This involves the entry point at the beginning of an LDU2 402 that precedes a subsequent LDU1 404 where complete validation of the MAC takes place. It takes 180 ms to identify the MI and MAC in the preceding LDU2 402, and another 145.5 ms to see the LC block in the following LDU 1 404. The worst-case late entry is 685.5 ms. It occurs when the initial entry point takes place just after the first bit of LDU 2 is received. This prevents the receiver from syncing up to LDU 2, and essentially delays late entry by 360 ms.

Figure 5:
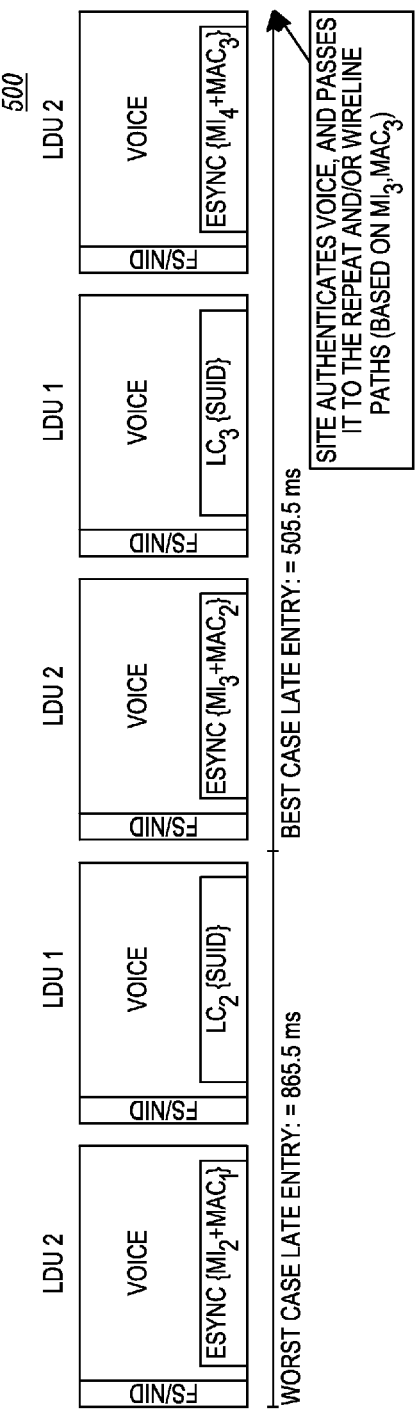
FIG. 5 is another block diagram of a voice packet sent from a radio with a late entry delay in accordance with some embodiments.

FIG. 5 is another block diagram of a voice packet sent from a radio with a late entry delay in accordance with some embodiments. The best-case late entry is approximately 500 ms. This involves the entry point at the beginning of an LDU 2 that precedes the subsequent LDU 2 where complete validation of the MAC takes place. It takes 180 ms to see the MI, 180 ms to see the LC for the message digest, and approximately another 140 ms to see the MAC. The worst-case late entry is approximately 860 ms. It occurs when the initial entry point takes place just after the first bit of LDU 2 is received. This prevents the receiver to sync up to LDU 2, and essentially delays late entry by 360 ms.

Figure 6:
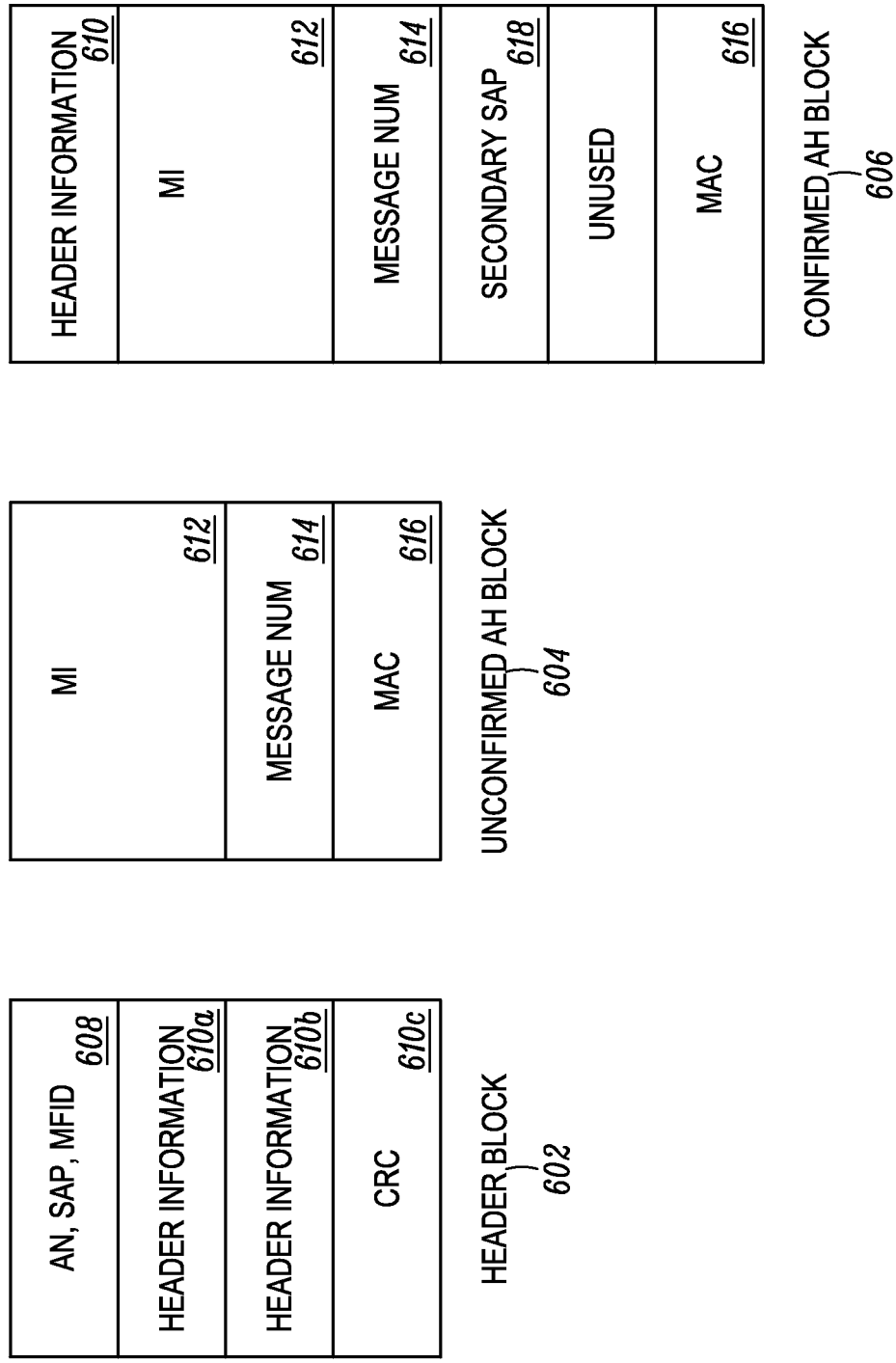
FIG. 6 is a block diagram of a secondary authentication header in accordance with some embodiments.

An embodiment allows for use of a secondary authentication header. FIG. 6 is a block diagram of the secondary authentication header (AH) in accordance with some embodiments. AH 600 includes a header block 602, an unconfirmed AH block 604, and a confirmed AH block 606. Header block 602 includes a first portion 608 and one or more other portions 610 with header information and information for error detection. The first portion includes a bit (AN) which indicates if the AH is confirmed or unconfirmed, a service access point (SAP) value for indicating that that a packet data unit (PDU) or multi-block trunking (MBT) message is being authenticated, and a manufacture ID (MFID). The SAP value also indicates that a secondary header 604 including the MI is to follow.

Unconfirmed AH 604 includes MI 612, a message number 614 and a 2-byte MAC 616. The message number increases every time the radio sends a PDU or a MBT message. The site may not accept a PDU or MBT whose message number is less than the current value associated with the source unit or transmitting radio ID in the authorization table. The message digest of the MAC is the header block 602, message number 614 and MI 612. The MAC key is the DCK (derived cipher key from the challenge response authentication handshake).

For confirmed, authenticated PDUs, the value of the SAP that normally appears in header block 602 (primary SAP) when authentication is not applied is encoded into a secondary SAP field 618 within the confirmed AH block 606. The secondary SAP 618 is the service access point value for the remaining portion of the PDU. The primary SAP value indicates that the PDU is authenticated, and uses confirmed AH block 606. For unconfirmed, authenticated PDUs and MBTs, there is no room for a Secondary SAP in unconfirmed AH block 604. Therefore, the Primary SAP in the Header Block use new, reserved values that indicate an authenticated version of the PDU is being used, which includes unconfirmed AH block 604 that follows the Header Block 602. For example, existing SAP value 404 indicates "Unauthenticated IP Data". A new SAP value will indicate "Authenticated IP Data".

For data and MBT operation, the radio uses a random (or pseudorandom) value for the MI. If the radio has an LFSR, this value can be obtained from the LFSR. Otherwise, the radio assigns a random value through some other means. Just as with the case with voice, either a C-MAC or H-MAC can be used. For C-MAC, the last 16 bits of the cipher stream will be used as the MAC value. For H-MAC, a 16-bit hash of the message digest will be encrypted.

Embodiments therefore provide a method for authenticating messages, wherein eight bits of the MAC used for voice authentication are added to the 8 least significant bits of, for example, the P25 MI field. The other eight bits of the MAC used for voice authentication are added to the Link Control words that are embedded in the voice stream. Two new conventional voice LCs are used. Both use the Implied MFID format. This format frees up the octet that otherwise contains the 8-bit MFID. The MAC for an embedded voice Link Control block is computed prior to transmitting the LC block, in order to improve throughput and late entry performance. The radio is capable of constructing the LC block in advance of its transmission. The radio uses this opportunity to compute the associated MAC as well. As a result, part of the MAC is delivered prior to the transmission of the LC block.

Embodiments therefore allow, for example, the P25 conventional RF site to selectively pass-through received signals. Signals must include an authorized radio ID. Validation of source and integrity of the signal is performed using a 16-bit message authentication code. The message digest of voice signals is embedded in the link control field. The message digest of packet data units covers portions of the headers.

A new Authentication Header is used for PDUs. The Authentication Header includes the MAC for the cryptographic calculation and a message number. The message number is reset between the radio and the fixed network every time the radio successfully completes an authentication exchange. The fixed network keeps track of the last received message number from the radio. For confirmed data, a new Primary SAP indicates that an Authentication Header follows. The Secondary SAP indicates the format of the remainder of the PDU that follows the Authentication Header. For unconfirmed data, new Primary SAPs indicates the format of the PDU, and indicates that the PDU includes an Authentication Header.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for authenticating a message stream in a site, the method comprising:
   authenticating a radio at a site and storing unique authentication information for the radio at the site;
   receiving a subsequent non-authentication message from the radio at the site and identifying authentication information in the non-authentication message;
   comparing the unique authentication information stored at the site with authentication information identified in the non-authentication message, and when there is a match, authenticating the non-authentication message with an authentication code included in the non-authentication message, and
   upon successfully completing authentication, repeating the non-authentication message towards destination radios indicated in the non-authentication message;
   wherein the non-authentication message is a voice packet and a first predefined portion of the authentication code is obtained from a header portion of the voice packet and a second predefined portion of the authentication code is obtained from a data portion of the voice packet; and
   wherein the first predefined portion of the authentication code is obtained from a message indicator field in the header portion of the voice packet and the second predefined portion of the authentication code is obtained from a link control word in the data portion of the voice packet.

2. The method of claim 1, wherein the authentication code is computed with a message indicator and a derived cipher key included in the authentication information stored at the site.

3. The method of claim 1, further comprising repeating the header portion and the data portion if the non-authentication message is successfully authenticated.

4. The method of claim 1, further comprising discarding the non-authentication message if the authentication is unsuccessful.

5. The method of claim 1, wherein a message indicator in the header portion is selected from a linear feedback shift register when the non-authentication message is an encrypted voice message or the message indicator is a random value when the non-authentication message is an unencrypted voice message.

6. The method of claim 1, wherein the authentication code is one of a 16 bit cipher code or a 16 bit hash code.

7. The method of claim 1, wherein the predefined portion of the authentication code embedded in the data portion is computed prior to receiving the data portion.

8. The method of claim 1, wherein the second portion of the authentication code is placed in the link control word according to an implied manufacture identifier format.

9. A method for authenticating a message stream in a site, the method comprising:
   authenticating a radio at a site and storing unique authentication information for the radio at the site;
   receiving a subsequent non-authentication message from the radio at the site and identifying authentication information in the non-authentication message;
   comparing the unique authentication information stored at the site with authentication information identified in the non-authentication message, and when there is a match, authenticating the non-authentication message with an authentication code included in the non-authentication message, and upon successfully completing authentication, repeating the non-authentication message towards destination radios indicated in the non-authentication message;

wherein the non-authentication message is a voice packet and a first predefined portion of the authentication code is obtained from a header portion of the voice packet and a second predefined portion of the authentication code is obtained from a data portion of the voice packet; and wherein the identifying authentication information in the message comprises buffering the header portion of the voice packet, identifying a source identifier in the data portion of the voice packet, and validating the source identifier with the authentication information stored at the site.

10. A method for authenticating a message stream in a site, the method comprising:

authenticating a radio at a site and storing unique authentication information for the radio at the site;

receiving a subsequent non-authentication message from the radio at the site and identifying authentication information in the non-authentication message;

comparing the unique authentication information stored at the site with authentication information identified in the non-authentication message, and when there is a match, authenticating the non-authentication message with an authentication code included in the non-authentication message, wherein a predefined portion of the authentication code is obtained from at least one of a header portion or a data portion of the non-authentication message; and upon successfully completing authentication, repeating the non-authentication message towards destination radios indicated in the non-authentication message;

wherein the message is a control packet and the authentication information in the message comprises one of an unconfirmed header block and a confirmed header block; and wherein the header block includes a service access point value for indicating that a control message is being authenticated and that a secondary header is being used.

11. The method of claim 10, further comprising keeping track of a message number in the unconfirmed header block and denying a control packet whose message number is less than a current value associated with the radio.

* * * * *